July 3, 1962  R. LUCIEN  3,042,058
HIGH OUTPUT DIFFERENTIAL ELECTROMAGNETIC VALVE
Filed Feb. 21, 1958  9 Sheets-Sheet 1
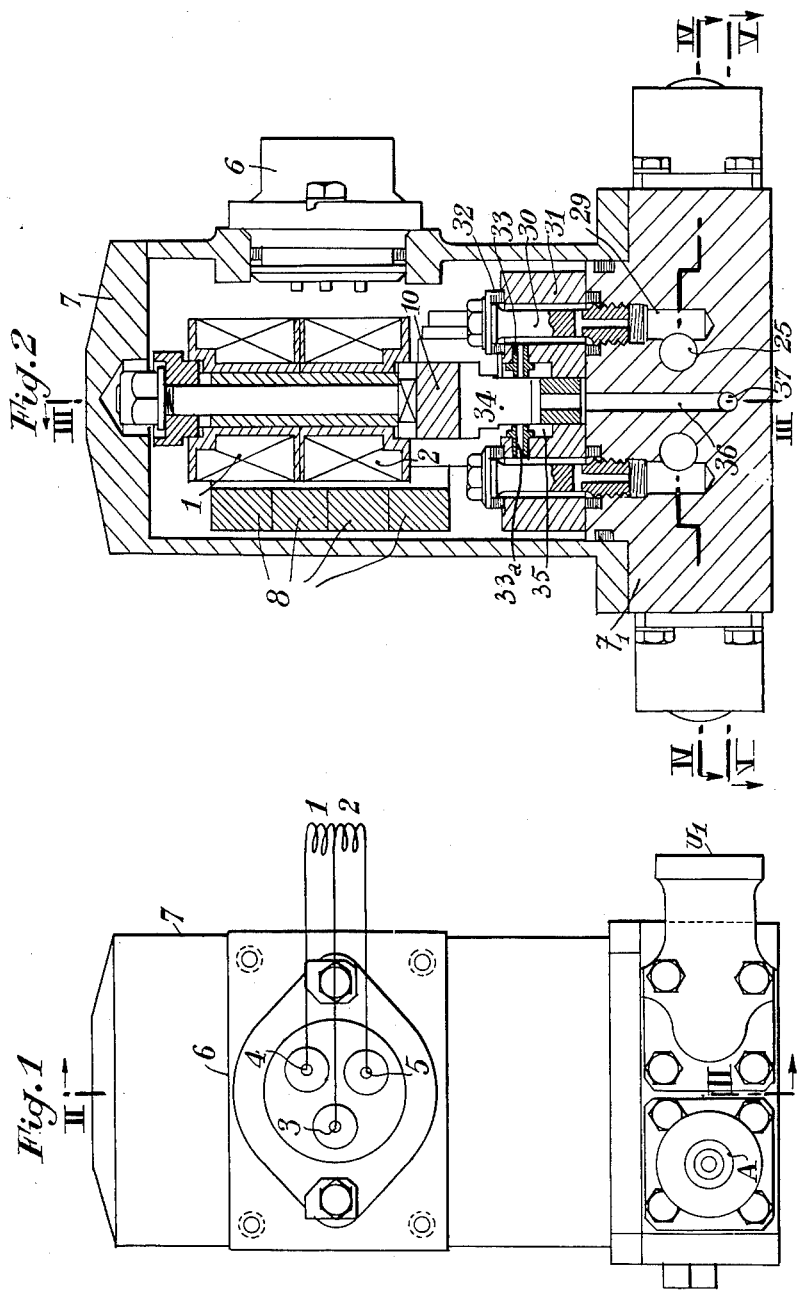

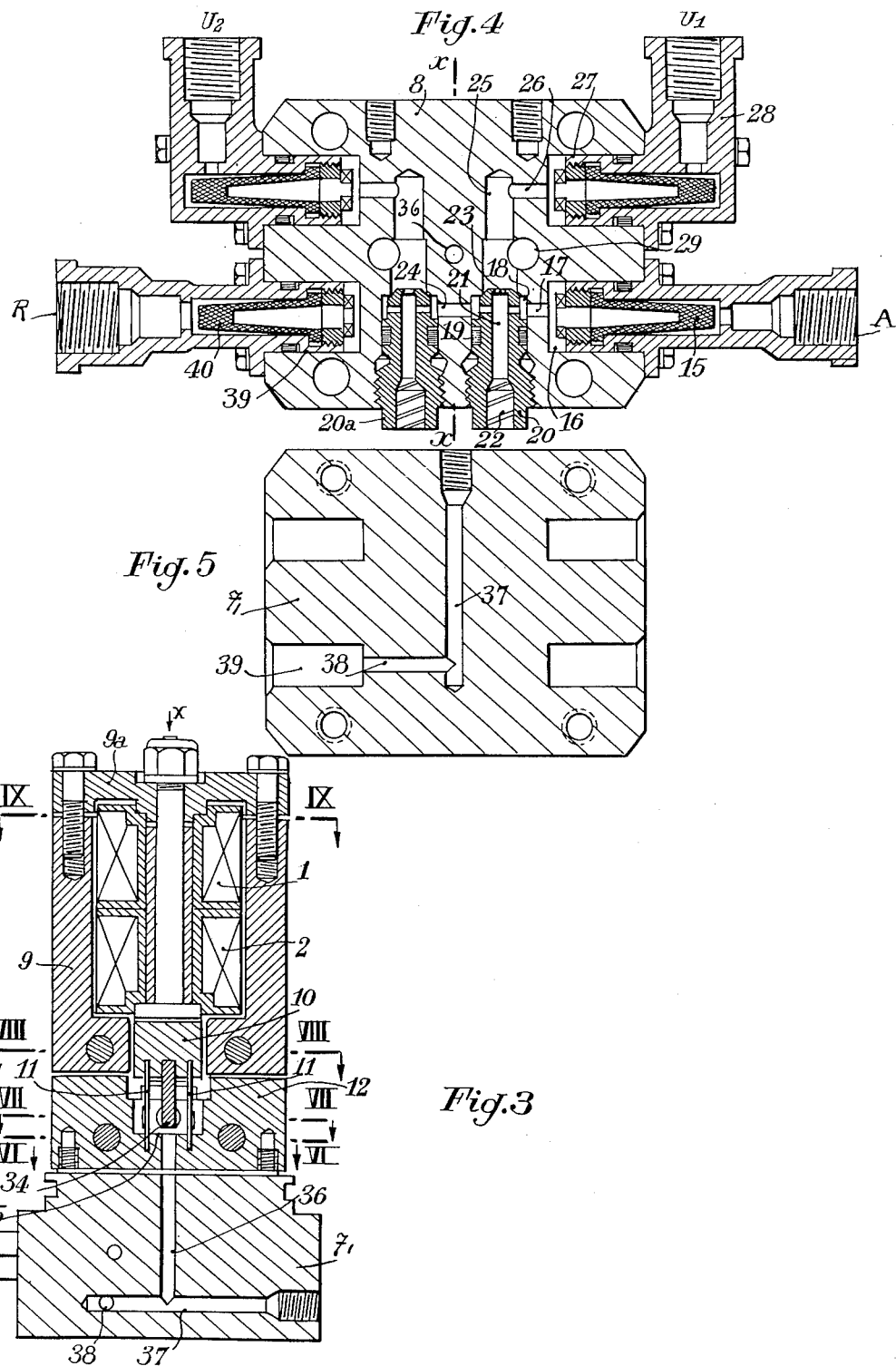

July 3, 1962 R. LUCIEN 3,042,058
HIGH OUTPUT DIFFERENTIAL ELECTROMAGNETIC VALVE
Filed Feb. 21, 1958 9 Sheets-Sheet 3
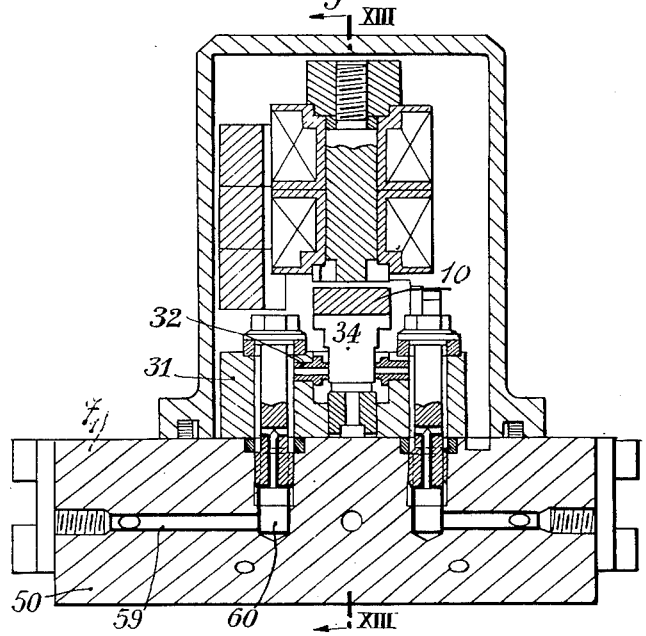
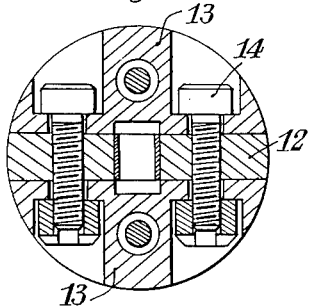
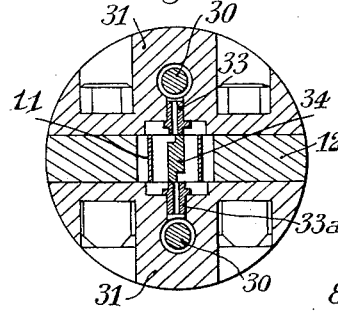
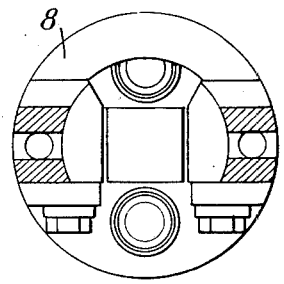
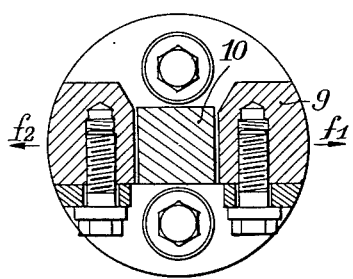

July 3, 1962 R. LUCIEN 3,042,058
HIGH OUTPUT DIFFERENTIAL ELECTROMAGNETIC VALVE
Filed Feb. 21, 1958 9 Sheets-Sheet 4

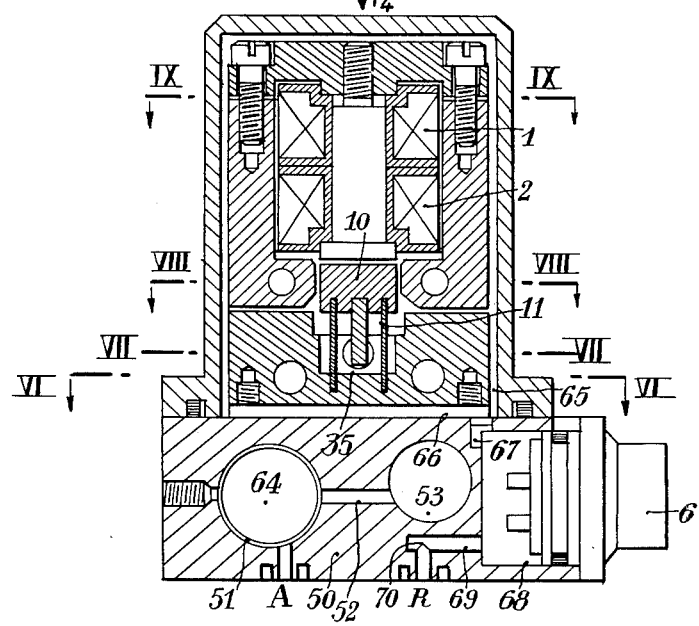
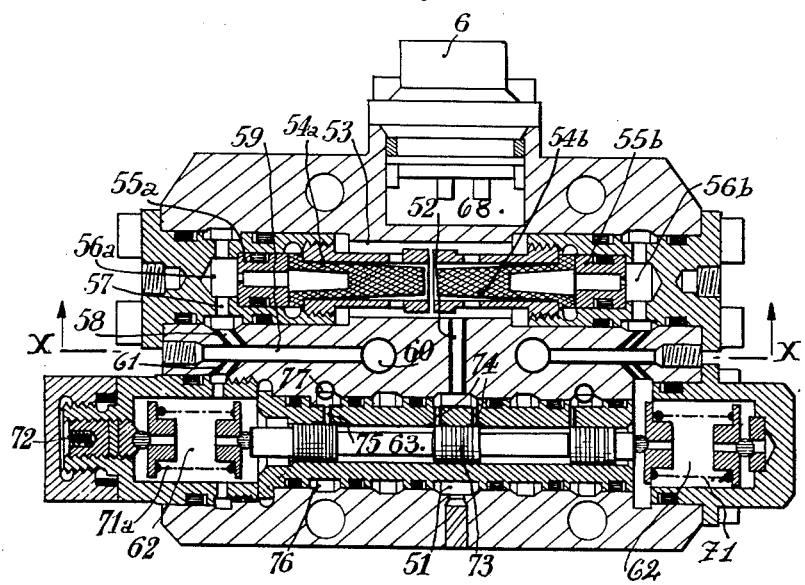

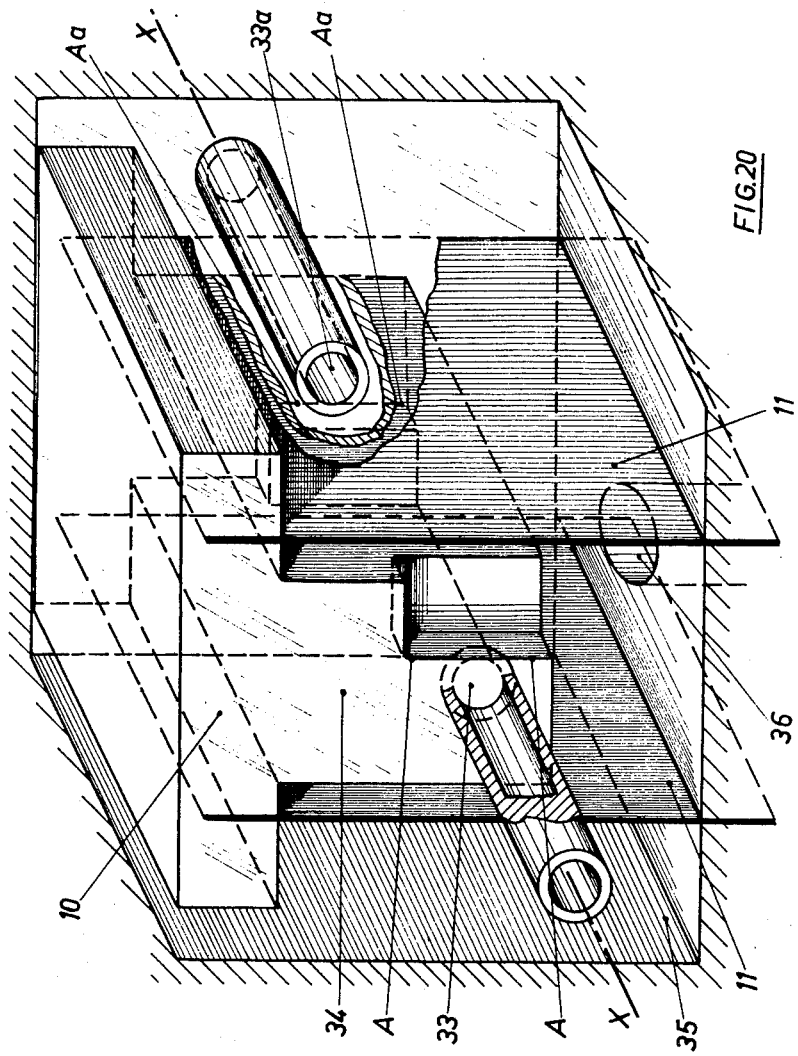

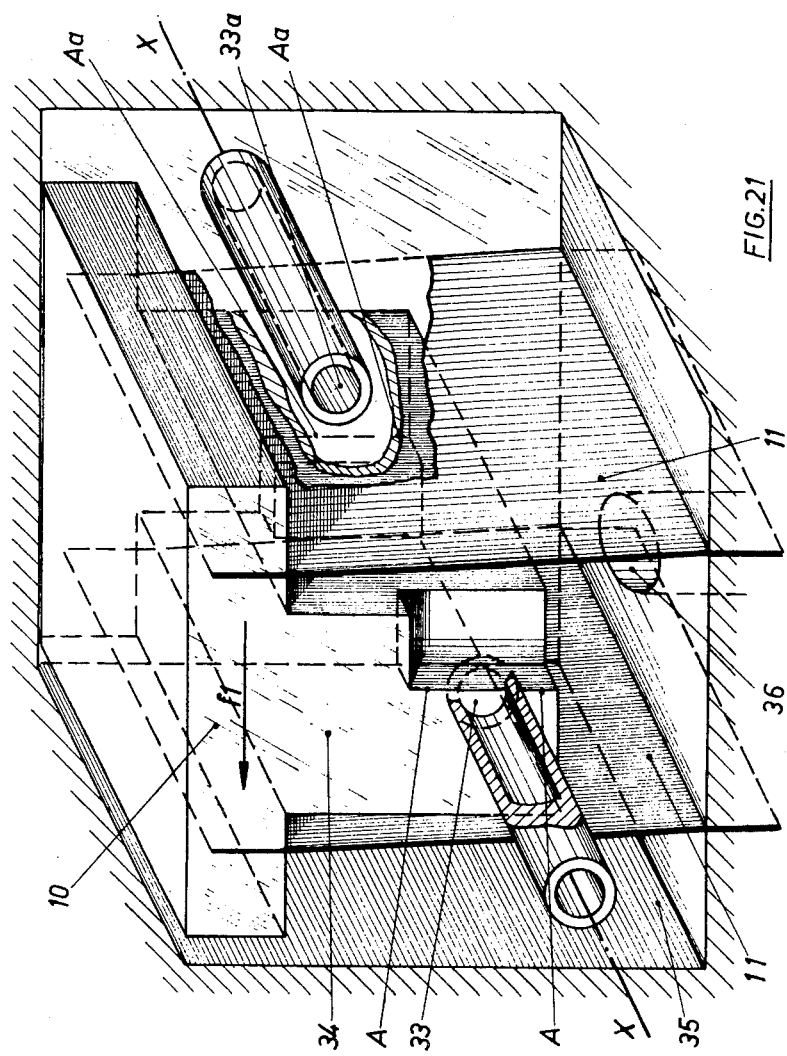

United States Patent Office 3,042,058
Patented July 3, 1962

3,042,058
**HIGH OUTPUT DIFFERENTIAL ELECTRO-
MAGNETIC VALVE**
René Lucien, Neuilly-sur-Seine, France, assignor to Société a Responsabilite Limitee: Recherches Etudes Production R.E.P., Paris, France, a corporation of France
Filed Feb. 21, 1958, Ser. No. 716,579
Claims priority, application France Feb. 22, 1957
4 Claims. (Cl. 137—82)

The invention relates to electrohydraulic control systems of the type in which a valve delivers to a servo-mechanism, such as a hydraulic jack two opposed fluid pressures which maintain it in a stationary position for a given condition of an electro-magnetic control system, while a variation of this condition in one direction or the other involves a differential variation in the pressures delivered, setting the servo-motor in action, in one direction or the other.

One object of the invention is to provide a distribution valve for such a system which is capable of delivering to the servo-motor considerable energy, controlled by very slight variations in the electrical control energy and the servo-energy being a direct function of the variation in electrical energy.

The manner in which this and other objects of the invention are achieved will be explained in the following description which relates to certain specific embodiments of the invention but it will be understood that the scope of the invention is not restricted to these embodiments.

In the accompanying drawings,

FIGURE 1 is an elevation of one embodiment of an electro-magnetic distribution valve;

FIGURE 2 is a section on the line II—II of FIGURE 1, looking in the direction of the arrows;

FIGURE 3 is a section on the line III—III in FIGURE 2 looking in the direction of the arrows, with an external casing removed;

FIGURE 4 is a section on the line IV—IV of FIGURE 2 looking in the direction of the arrows;

FIGURE 5 is a section on the line V—V of FIGURE 2, looking in the direction of the arrows;

FIGURES 6, 7, 8 and 9 are similarly sections respectively on the lines VI—VI, VII—VII, VIII—VIII and IX—IX of FIGURE 3;

FIGURE 10 is a vertical section through a second embodiment of electrohydraulic distribution valve;

FIGURE 13 is a section upon the line XIII—XIII of FIGURE 10, looking in the direction of the arrows;

FIGURE 14 is a sectional plan upon the line XIV—XIV of FIGURE 11;

FIGURES 20 and 21 illustrate diagrammatically and in perspective a detail of the above structures.

Figure 11:
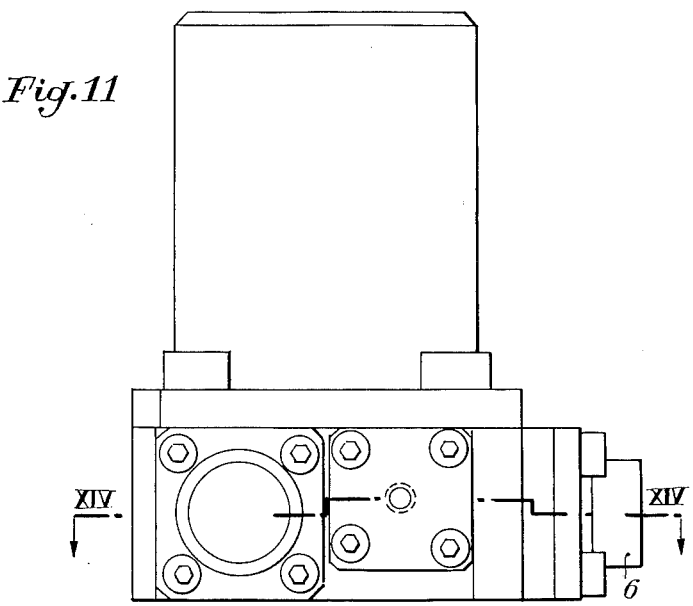
FIGURE 11 is an external elevation of one side of the same.
Figure 12:
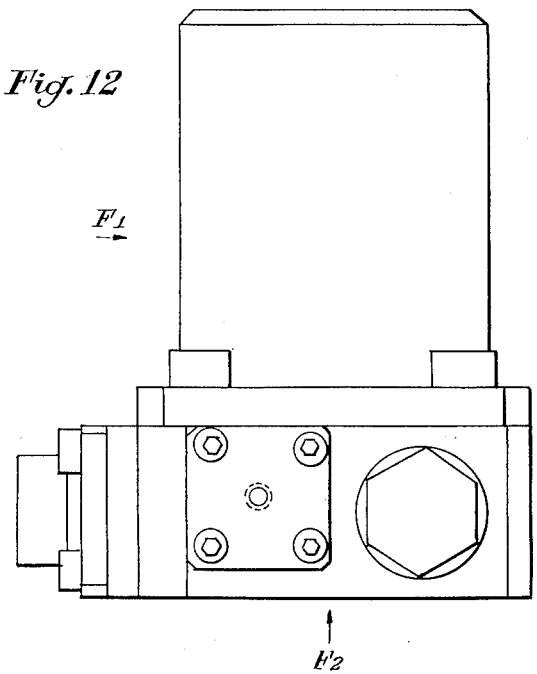
FIGURE 12 is an elevation of the opposite side from that of FIGURE 11.
Figure 15:
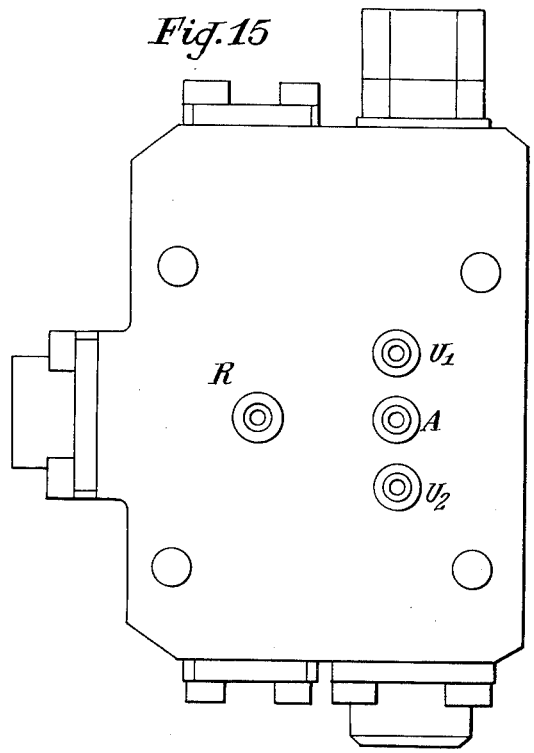
FIGURE 15 is an underside plan, looking in the direction of the arrow $F_2$, of FIGURE 12.
Figure 17:
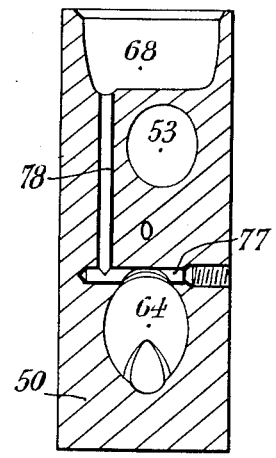
FIGURE 17 is a section upon the line XVII—XVII of FIGURE 16.

The distribution valve shown in FIGURES 1 to 9 comprises (FIGURE 4) a supply aperture A, two delivery ports $U_1$, $U_2$ for conveying pressure of liquid to two corresponding ports in a servo-motor, and an aperture R for exhausting liquid to a reservoir.

The electrical control magnet comprises two coaxial coils 1, 2 having a common terminal 3 (FIGURE 1) while the other ends of the coils are connected to terminals 4—5 on a terminal block 6, fixed to the wall of a casing 7 which encloses the electro-magnetic part of the valve and rests on the base $7_1$ which contains the hydraulic mechanism.

In FIGURE 1, the two coils are shown diagrammatically outside the casing 7 in order to facilitate understanding the manner in which the connections are made. The terminals 3, 4 and 5, which are preferably enclosed, are connected to an electric circuit arranged in any known manner capable of causing the intensity of the current in the coils 1 and 2 to vary differentially, for example as a function of the displacement of a control member of an electric supply apparatus. Permanent magnets 8 (FIGURES 2 and 9) polarize the magnetic circuit which includes a core 9 (FIGURE 3) and an armature 10 situated between the pole pieces of the core 9. An air gap is left between the core 9 and the upper transverse member 9a. The armature 10 is resiliently supported by two spring wires or blades 11 of steel or bronze (FIGURES 3 and 7) embedded in a recess in a transverse member 12. The latter is clamped between two members 13 by means of bolts 14 (FIGURE 6).

The armature 10 is in a neutral position when the two coils 1, 2 are energized with the same voltage and is displaced in the direction of the arrow $f_1$ or of the arrow $f_2$ (FIGURE 8) according to whether the voltage is higher in one or other of the two coils 1 and 2.

The hydraulic circuit is as follows: liquid under pressure arriving through A passes through a filter 15 (FIGURE 4) and reaches the end of the cylindrical chamber 16. A passage 17 conveys it from said chamber into an annular space 18 provided at the end of a chamber 19 around the end of a nozzle 20, the other end of which is screwed into the entrance to the chamber 19. The nozzle 20 comprises an axial passage 21 closed at the outer end by a stopper 22 and ending in a narrow-section aperture 23. The liquid under pressure spreads through the annular space 18 and divides into two streams one of which enters the nozzle 20 through transverse ducts and the other of which makes its way through a connecting passage 24 in the block 8 towards an annular space which is identical with the annular space 18, around a nozzle 20a which is identical to the nozzle 20 and arranged symmetrically with respect to the median plane x—x of the distributor.

The outlet 23 of the nozzle 20 leads into a passage 25 from whence through a transverse duct 26 it reaches the end of a cylindrical chamber 27 in which is fitted, in a sealed manner, one arm of an elbowed member 28 comprising two perpendicular passages which inter-communicate. One contains a filter, similar to the filter 15, through which the liquid has to pass; the other leads to the utilization aperture $U_1$. The outlet of nozzle 20a is connected to the aperture $U_2$, following a path of symmetrical to that followed by the stream leaving the nozzle 20, to reach the aperture $U_1$.

Perpendicular to the passage 25 from nozzle 20 and leading into it is a well 29 (FIGURE 2) which is blocked by the end of a rod 30 which passes, with a certain amount of clearance, through the member 31 and the head 32 of which rests, by means of a packing ring, on said member. Arranged transversely in the member 31 is a tubular nozzle 33 which opens out of the annular space around the rod 30. The nozzle 33 is in barely touching contact with a member 34 carried by the armature 10. There is an identical tubular nozzle 33a which is symmetrical with the tubular nozzle 33 and is fed by a well connected with the nozzle 20a. In section, the member 34 has the outline shown in FIGURE 7, namely of a rectangle from which small rectangular recesses have been removed in two diagonally-opposed corners. The depth of these recesses, measured in the direction perpendicular to the axis of the tubes 33, is such that, in the position of rest, which is that shown in FIGURE 7, the two tubular nozzles 33, 33a are almost totally closed and the sections afforded to the flow of the hydraulic fluid through them are exactly the same. This fluid is collected in a central well 35 (FIGURE 2) and flows through the passage 36 to further passages 37, 38 into the cylindrical chamber 39 (FIGURES 4 and 5) from whence, after having passed through a filter 40, it reaches the exhaust outlet R and is conveyed to a reservoir, whence it can be recirculated by a pressure pump to inlet A.

Now if the strength of the currents in coils 1 and 2 becomes unbalanced, the member 34 is displaced in the direction of one of the arrows $f_1$ or $f_2$ as the case may be, and thus covers one of the tubular nozzles 33, 33a (FIGURE 7), while the other is progressively further uncovered. Member 34 moves in a direction along an axis which is substantially perpendicular to the line or axis joining nozzles 33, 33a. The result is a greater loss of head in one of the utilization circuits and an increase in pressure in the other and, consequently, the actuation of the servo-motor in one direction or the other. The motive pressure, which is equal to the difference in the utilization pressures delivered through $U_1$ and $U_2$ is a function of the amplitude of the displacement of the mobile member 34, and hence of the flexion of the blades 11 and consequently of the difference in the strength of the currents in the two coils.

The mobile member 34 is displaced practically without any friction since the nozzles 33, 33a barely touch it and so exert no mechanical force on it and moreover, as it receives the pressures of the liquid on two opposite faces, perpendicularly to its direction of displacement and parallel to the greatest dimension of blades 11, 11, this adjustment is not upset by the hydraulic pressure. Since the spring blades 11 may have a very great flexibility, the sensitivity of the apparatus is likewise very great.

A modification of the distribution valve which is shown in FIGURES 10 to 17, enables it to supply a servo-motor having a much higher power output. The electro-magnetic control is the same as before, but the differential pressures delivered, instead of being applied direct to the servo-motor, are used to actuate a piston valve 63 (FIGURE 14) incorporated in the base of the apparatus. It is this valve, which is in direct hydraulic communication with the inlet for pressure fluid, which, through the displacements which it receives from the electro-magnetic valve member 10 transmits differential pressures to the servo-motor.

In FIGURES 10 to 17 parts which are identical with those in the distributor previously described bear the same reference numerals. FIGURES 6 to 9 already described may be regarded as sections upon the lines VI—VI, VII—VII, VIII—VIII, IX—IX of FIGURE 13.

Terminal block 6, which supplies the current to the two coils 1 and 2 is housed in the hydraulic block which in this example is shown at 50. Apart from this difference the whole electro-magnetic system is the same as before.

Figure 16:
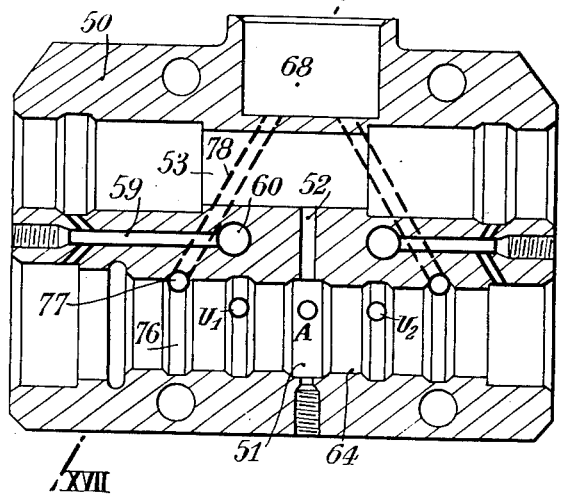
FIGURE 16 is a sectional plan in the same plane as FIGURE 14 but with certain parts removed.

The hydraulic system is as follows:

The inlet aperture A, delivering apertures $U_1$ and $U_2$ and exhaust aperture R, are in the underside of the block 50 (see FIGURES 13 and 16). The aperture A leads into a groove 51 (FIGURE 14) from whence a passage 52 conveys the liquid into a cylindrical cavity 53 which is closed at its two ends. There it divides into two streams which pass respectively through the filters 54a and 54b at the outlets from which are nozzles 55a, 55b which lead into chambers 56a, 56b. Since the paths of the liquid are substantially symmetrical, the left-hand one only will be described with respect to FIGURES 14 and 10. From the chamber 56a, the liquid passes through the passages 57, 58 into the passage 59 which conveys it to a well 60 on the one hand, and, through the passage 61, to a chamber 62, arranged at the end of the cylinder of a piston valve spool 63, housed in the cavity 64 (FIGURE 13). From the well 60 (FIGURE 10), the liquid rises through the rod 30 as in the previous valve, into an annular chamber in the member 31 from whence it is conveyed into the tube 32. This leads towards the portion 34 of the core 10, which operates as explained above. The exhaust liquid, which overflows from the cavity 35 (FIGURE 13) flows through channels 65, 66, 67 into the cavity 68 which serves as a housing for the current terminals 6. From this cavity it passes through 69 and 70 to the return aperture R.

In this valve, and also if desired in the one first described, the current terminals are in contact with the hydraulic liquid, and it is therefore necessary for the terminal box to be sealed.

The differential variations in the current in the coils 1 and 2, which determine differential variations of pressure in the well 60 have the effect of causing differences in pressure in the chambers 62 at the ends of the piston valve-spool 63.

When the current is balanced in the two coils, the pressure is equal in the two chambers 62 and the slide 63 is in a neutral position. It is centered there by means of two opposed return springs 71, one of which, 71a is provided with a regulating-screw device 72 which enables its tension to be adjusted so as to regulate it in this position.

In this position, the central piston 73 of the slide-valve covers the two passages 74 which are at the inlet pressure and are in communication with the groove 51.

In this position, the passages 75, which are in communication through the grooves 76 with the wells 77 and, through these (see FIGURES 16 and 17) with the passage 78, the chamber 68 and the return aperture R, are likewise closed by the end pistons of the piston-valve. Any displacement of the valve member 63 in one direction or the other, brings $U_1$ into communication with the supply A, and $U_2$ with the return R or vice versa.

It will be noted that the greater the unbalance in the pressure in the chambers 62, the more the piston valve is displaced (though its displacement is a function of the resistance of the return springs 71, 71a) and the more widely the apertures which bring $U_1$ and $U_2$ into communication with A and R are uncovered, which has the effect of insuring a delivery which is a function of the lack of balance in the strength of the currents in the control coils 1 and 2. The law of the delivery as a function of the lack of balance in the strengths of the control current may be adjusted as desired by means of a succession of passages such as 75 drilled radially in the sleeve of the slide valve but slightly staggered longitudinally and angularly in relation to one another.

Figure 18:
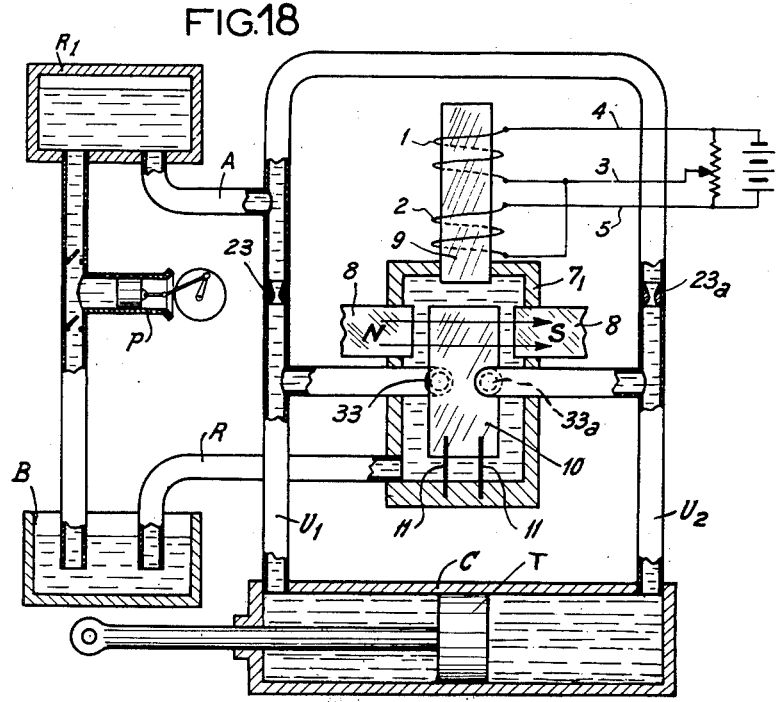
FIGURE18 is a schematic representation of the invention with the valve in its median position.
Figure 19:
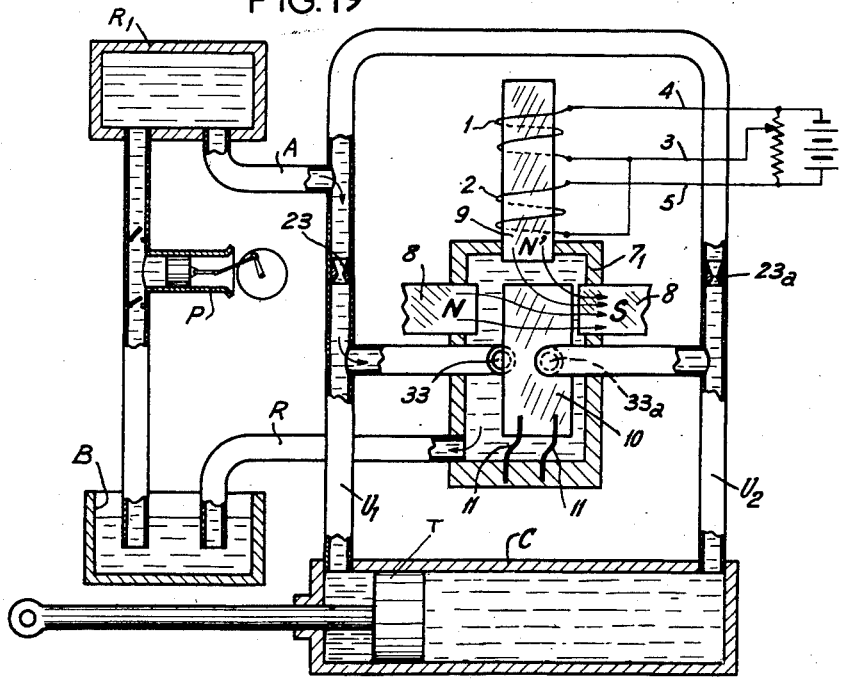
FIGURE 19 is another schematic representation of the invention with the valve operated for displacement in one direction.

FIGURES 18 and 19 are respectively a schematic representation of the valve with the armature 10 in its at-rest position when the sum of the electromagnetic fluxes in coils 1 and 2 are zero and a schematic representation of the valve with the armature 10 being displaced towards the right when the electromagnetic flux in coil 2 is greater than the electromagnetic flux in coil 1. In FIGURES 18 and 19, like reference numerals and characters refer to like parts in FIGURES 1 to 17, and a servo-motor C is shown coupled to utilization apertures $U_1$ and $U_2$ with apertures $U_1$ and $U_2$ being disposed for coupling the liquid to opposite sides of the piston of the servo-motor C. In FIGURE 18, the pressure of the liquid is shown to be equalized and applied to different sides of piston P for maintaining the piston of servo-motor C in its neutral position. In FIGURE 19, the pressure of the liquid through utilization aperture $U_2$ is shown to be greater than the pressure of the liquid through utilization aperture $U_1$ whereby to move the servo-motor piston towards the left when armature 10 is moved towards the right in response to coil 2 having the greater electromagnetic flux. It is to be noted that the nozzles 33 and 33a, which as mentioned heretofore have the same axis, are staggered for the purpose of enhancing the clarity of the drawing. Also shown in FIGURES 18 and 19 are tank $R_1$ containing the liquid under pressure, the pump P and the tank or reservoir B to which aperture R exhausts the liquid for recirculation to tank $R_1$. Pump P is provided to pump the liquid into tank $R_1$ under pressure from which it re-enters the system through supply aperture A which is coupled to tank $R_1$.

FIGURES 20 and 21 illustrate in perspective with parts broken away the armature 10 and member 34 mounted on the blades 11 and cooperating with the nozzles 33 and 33a. It is clearly apparent that the two nozzles 33 and 33a are centered on a same axis X—X and that this axis is perpendicular to the working faces of the armature member 34.

FIGURE 20 shows the armature member 34 in its middle position when the control of the pilot valve is not energized or is energized by equal and opposite currents. In this middle position the ridge A—A of the rectangular notch in the front working face of the armature member 34 is substantially tangent to the internal section of the nozzle 33. Similarly, the ridge Aa—Aa of the rectangular notch in the rear working face of the armature 34 is substantially tangent to the internal section of the nozzle 33a. This is visible only because portions of the blade 11 and member 34 are broken away. Consequently, the two nozzles 33 and 33a are hydrodynamically balanced for this middle position of the armature member 34. It will also be seen that the balancing of the armature member 34 results from equal and opposite hydraulic pressures.

If the control of the pilot valve is excited, it deplaces the armature 10 and member 34 to the right or to the left. FIGURE 21 illustrates the armature 10 and member 34 displaced toward the left in the direction of the arrow $f_1$. This displacement is accurately guided by the blades 11 which are resiliently deformed, so that the displacement can only be perpendicular to the axis X—X. In other words, each working face of the member 34 is moved in its own plane and can be fixedly positioned by construction in registry with the corresponding nozzle with extreme accuracy, providing an excellent cooperation of the nozzles and of the member 34. In the left-hand position of the member 34 according to FIGURE 21, the ridge A—A of the front face has partially uncovered the opening of nozzle 33, whereas the rear face of the armature member 34 has completely masked the nozzle 33a. Consequently, the nozzle 33a is closed and the nozzle 33 is open as a function of the magnitude of displacement of the armature member 34. It is obvious when the armature member 34 is displaced toward the right the nozzle 33 is closed and the nozzle 33a is open also as a function of the magnitude of displacement of the armature member 34.

I claim:

1. An electrically-actuated hydraulic fluid distribution-valve comprising a valve body, two opposed electromagnetic coils on the body and adapted to be energized by currents passing therethrough, a magnetic circuit operatively disposed with respect to and energized by said coils and including an armature displaceable under the influence of said coils, valve faces on the valve body, each of said valve faces being provided with a port, the ports being axially aligned along a first axis and being positioned relative to the armature such that when said armature moves the opening of one of the ports is increased and the opening of the other of the ports is reduced, resilient supports for said armature permitting displacement thereof relative to said valve-body and in a direction along a second axis substantially perpendicular to the axis of said axially aligned ports, and a movable valve element operatively connected to and movable with said armature and having faces cooperating with said valve faces, the faces of the movable element being parallel to said second axis, said valve body being provided with supply and exhaust passages coupled to said ports for the transferral of hydraulic fluid under pressure, movement of the movable element in one direction increasing pressure at one port and reducing it at the other, said valve body being provided with further passages connected to said supply passage to receive hydraulic fluid under pressure, each of said further passages being operatively associated with respective of said ports whereby the fluid pressure in said further passage is proportional to said increasing and reducing of pressure at said ports, said electro-magnetic coils when deenergized being adapted to maintain said armature and thereby said movable element in a position wherein said ports are equally and partially obturated, leakage through the ports passing continuously to said exhaust passage, said ports being related to the faces of said movable element so that the difference between the hydraulic pressure at the said further passages is a direct function of the difference in the strength of the currents in said electro-magnetic coils.

2. An electrically-actuated hydraulic fluid distribution valve comprising a valve body, two opposed electromagnetic coils supported on said body, a magnetic circuit operatively disposed with respect to and energized by said coils and including an armature displaceable under the influence of said coils, valve faces on the valve body and provided with respective ports axially aligned along a first axis, resilient supports supporting said armature and permitting displacement thereof relative to said valve body and in a direction along a second axis substantially perpendicular to said first axis, a movable valve element operatively connected to and displaceable with said armature and having faces cooperating with said valve faces, the faces of the movable element being parallel to said second axis, said valve body being provided with supply and exhaust passages coupled to said ports, movement of the armature and thereby the movable element in one direction selectively covering and uncovering the ports to increase pressure at one port and reduce it at the other, said valve body being provided with further passages connected to the supply passage and ports to deliver hydraulic fluid under pressure proportional to said increase and reduction of pressure.

3. A valve comprising means having spaced parallel faces and defining coaxially aligned openings having an axis perpendicular to said faces, a flat blade between said faces and flexible in a direction perpendicular to said axis while resisting deformations parallel thereto, a shutter on said blade and in closely spaced relation to said faces, and means operatively associated with said shutter to effect a displacement thereof under the guidance of said blade for the selective obturating of the said openings.

4. A valve as claimed in claim 3 wherein said shutter has faces parallel and juxtaposed with respect to the first said faces, the shutter faces being provided with recessions offset transversely with respect to said axis and positioned in correspondence with said openings whereby one of the openings is closed while the other is opened.

References Cited in the file of this patent

UNITED STATES PATENTS

| | | |
|---|---|---|
| 2,285,540 | Stein et al. | June 9, 1942 |
| 2,390,301 | Hart | Dec. 4, 1945 |
| 2,709,421 | Avery | May 31, 1955 |
| 2,729,751 | Westman | Jan. 3, 1956 |
| 2,767,689 | Moog | Oct. 23, 1956 |
| 2,832,318 | Paine | Apr. 29, 1958 |
| 2,835,265 | Brandstadter | May 20, 1958 |
| 2,854,956 | Hager | Oct. 7, 1958 |

FOREIGN PATENTS

| | | |
|---|---|---|
| 278,689 | Germany | Oct. 2, 1914 |
| 931,747 | Germany | Aug. 16, 1955 |
| 689,814 | France | Sept. 11, 1930 |